(12) United States Patent
Vezina (10) Patent No.: US 8,453,779 B2
(45) Date of Patent: Jun. 4, 2013

(54) SNOWMOBILE FRAME

(75) Inventor: Sebastien Vezina, Sherbrooke (CA)

(73) Assignee: Bombardier Recreational Products, Inc., Valcourt (CA)

( * ) Notice: Subject to any disclaimer, the term of this patent is extended or adjusted under 35 U.S.C. 154(b) by 190 days.

(21) Appl. No.: 13/131,876

(22) PCT Filed: Nov. 28, 2008

(86) PCT No.: PCT/US2008/085059
§ 371 (c)(1),
(2), (4) Date: May 30, 2011

(87) PCT Pub. No.: WO2010/062293
PCT Pub. Date: Jun. 3, 2010

(65) Prior Publication Data
US 2011/0240398 A1 Oct. 6, 2011

(51) Int. Cl.
*B62D 21/00* (2006.01)
*B62D 55/00* (2006.01)
*B62M 27/02* (2006.01)

(52) U.S. Cl.
USPC ........... 180/190; 180/232; 180/312; 180/274; 180/182; 280/784

(58) Field of Classification Search
USPC .............. 180/232, 311, 312, 274, 182, 186, 180/190; 280/274
See application file for complete search history.

(56) References Cited

U.S. PATENT DOCUMENTS

| 6,199,649 | B1 | 3/2001 | Alanko |
| 6,357,543 | B1 | 3/2002 | Karpik |
| 6,367,869 | B1 | 4/2002 | Baccouche et al. |
| 6,631,777 | B1 | 10/2003 | Thompson |
| 2003/0029663 | A1* | 2/2003 | Etou .............................. 180/312 |
| 2011/0290574 | A1* | 12/2011 | Maltais ......................... 180/190 |

FOREIGN PATENT DOCUMENTS
RU 2307759 C1 10/2007

OTHER PUBLICATIONS
International Search Report from PCT/US2008/085059 mailed on Jun. 8, 2009; Booij, Nico.

* cited by examiner

*Primary Examiner* — Ruth Ilan
(74) *Attorney, Agent, or Firm* — BCF LLP (57) ABSTRACT

A snowmobile frame (106) is described, with a tunnel (108) having an inverted U-shape. An engine cradle (110) is attached to a forward portion of the tunnel. A suspension assembly (112) is disposed forwardly of the engine cradle. At least one support member (142) supports the suspension assembly on the engine cradle. The at least one support member forms a crumple zone between the suspension assembly and the engine cradle. The at least one support member resists plastic deformation in response to the first predetermined force exerted on the suspension assembly. The at least one support member undergoes plastic deformation in response to a second predetermined force being exerted on the suspension assembly. The second predetermined force is greater in magnitude than the first predetermined force. The tunnel resists plastic deformation in response to the second predetermined force.

18 Claims, 7 Drawing Sheets

SNOWMOBILE FRAME

CROSS-REFERENCE

The present application is the United States National Stage of PCT/US2008/085059, filed Nov. 28, 2008, entitled 'Snowmobile Frame', the entirety of which is incorporated herein by reference.

FIELD OF THE INVENTION

The present invention relates to snowmobile frames.

BACKGROUND OF THE INVENTION

Snowmobiles, particularly utility snowmobiles, are sometimes used in areas without groomed trails. In such conditions, it is not uncommon for the front skis of the snowmobile to strike an object hidden from view by the snow, such as a rock or a tree stump. As such, the frames of these snowmobiles must be of a sufficiently rigid construction to withstand these impacts.

Figure 1:
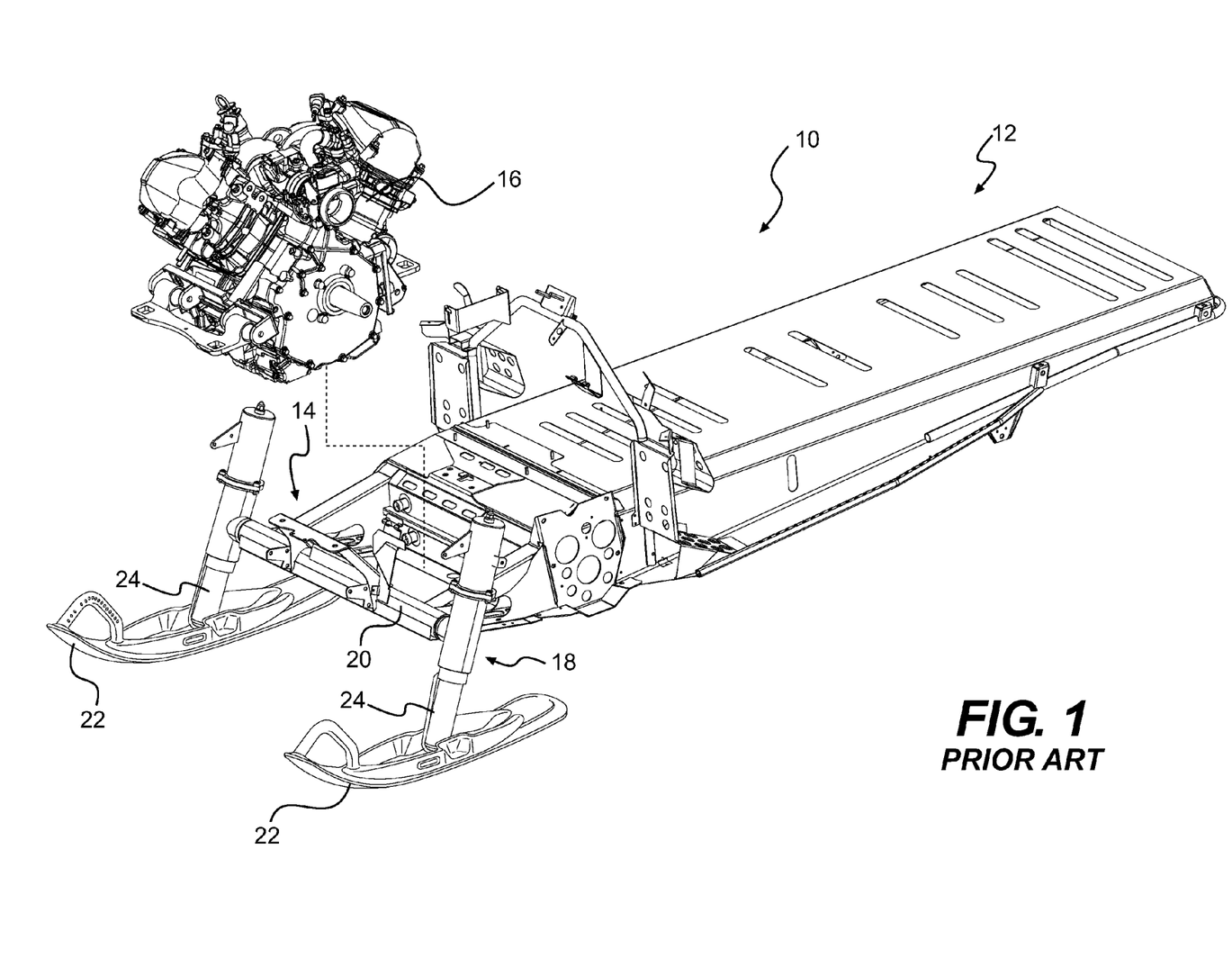
FIG. 1 is a perspective view, taken from a front, left side, of a snowmobile frame according to the prior art.

Referring to FIG. 1, a prior art snowmobile frame 10 includes a tunnel 12 made of stamped sheet metal having an inverted U-shaped cross section. An endless drive track (not shown) is disposed in part inside the tunnel 12. An engine cradle 14 is rigidly attached to a forward part of the tunnel 12, for example with bolts, by welding, or by forming both together as a single part. The engine cradle 14 supports an internal combustion engine 16 that powers the drive track via a transmission (not shown) to propel the snowmobile. The inherent rigidity of the engine 16 contributes additional rigidity to the engine cradle 14. A front suspension assembly 18 includes a cross member 20 that also forms a forward part of the engine cradle 14. The cross member 20 supports a pair of front skis 22, each via a shock absorber 24. The rigidity of the frame 10 may be further enhanced by the addition of a pyramidal support structure (not shown) connected to the tunnel 12, the engine cradle 14 and the front suspension assembly 18.

In the event that one of the skis of the snowmobile strikes an object, the frame 10 absorbs the forces differently depending on the severity of the impact. Light impacts are absorbed primarily by the shock absorber 24. Heavier impacts are sufficiently strong to fully compress the shock absorber, with the result that the majority of the impact is borne by the rigid portions of the frame 10, namely the tunnel 12, the engine cradle 14 and the front suspension assembly 18. In most cases, the frame 10 is rigid enough to withstand these impacts without sustaining permanent damage. However, it is possible for the impact to be severe enough to cause plastic deformation of the frame 10. The plastic deformation occurs at the portion of the frame 10 that is structurally the weakest, generally either a part of the tunnel 12 or side walls of the engine cradle 14 that form part of the connection between the tunnel 12 and the engine cradle 14. As a result, plastic deformation of the frame 10 generally causes a misalignment between the engine cradle 14 and the tunnel 12, and therefore between components of the transmission that transfer power from the engine 16 to the endless track, potentially rendering the snowmobile inoperable.

Attempting to repair the snowmobile by restoring the shape of the existing frame 10 can result in a less than perfect alignment of transmission components, because the bends cannot always be completely removed. In these cases, it is impossible to adequately repair the vehicle without replacing the entire frame 10, resulting in high repair costs.

Therefore, there is a need for a snowmobile frame having reduced repair costs from sustaining severe impacts.

SUMMARY OF THE INVENTION

It is an object of the present invention to ameliorate at least some of the inconveniences present in the prior art.

It is also an object of the present invention to provide a snowmobile frame having a crumple zone between the front suspension assembly and the engine cradle.

It is also an object of the present invention to provide a snowmobile frame that maintains alignment between the engine cradle and the tunnel when experiencing an impact severe enough to damage the frame.

It is also an object of the present invention to provide a snowmobile frame that resists plastic deformation of the tunnel when experiencing an impact severe enough to damage the frame.

In one aspect, the invention provides a snowmobile frame comprising a tunnel having an inverted U-shape. An engine cradle for supporting an engine with a crankshaft oriented transversely is attached to a forward portion of the tunnel and extends forwardly from the tunnel. A suspension assembly is disposed forwardly of the engine cradle. At least one support member supports the suspension assembly on the engine cradle. Each of the at least one support member has a rearward portion connected to the engine cradle and a forward portion connected to the suspension subassembly. The at least one support member forms a crumple zone between the suspension assembly and the engine cradle.

In a further aspect, the at least one support member is at least one generally triangular support member.

In a further aspect, the at least one support member includes bent sheet metal.

In a further aspect, the at least one support member comprises two support members.

In a further aspect, each of the at least one support member has a generally rearwardly facing base attached to the engine cradle and a generally forwardly facing apex attached to the suspension assembly. The apex is disposed laterally outwardly of the base with respect to a longitudinal center line of the frame.

In a further aspect, a pyramidal support structure is disposed generally above the tunnel and the engine cradle. The pyramidal support structure has two first members connected to the tunnel. The pyramidal support structure has two second members connected to corresponding ones of the two support members. The second members are disposed forwardly of the first members.

In a further aspect, the apex of each of the at least one support member is disposed laterally outwardly of the engine cradle with respect to the longitudinal center line of the frame.

In a further aspect, the at least one support member undergoes plastic deformation in response to a force of between 17,000 N and 22,000 N exerted on the suspension assembly. The force is oriented in a vertical plane perpendicular to an axis of rotation of the crankshaft and angled upwardly and rearwardly at an angle of between 62 degrees and 68 degrees from horizontal.

In a further aspect, the force is about 22,000 N. The force is oriented at an angle of about 65 degrees from horizontal.

In a further aspect, the suspension assembly includes a generally transverse cross member. Left and right telescopic struts are attached to the cross member. The at least one support member is attached to the suspension assembly via the cross member.

In a further aspect, the suspension assembly is spaced apart from the engine cradle.

In an additional aspect, the invention provides a snowmobile frame comprising a tunnel having an inverted U-shape. An engine cradle for supporting an engine with a crankshaft oriented transversely is attached to a forward portion of the tunnel and extends forwardly from the tunnel. A suspension assembly is disposed forwardly of the engine cradle. The suspension assembly includes at least one shock absorber. The at least one shock absorber has a bottom-out position. At least one support member supports the suspension assembly on the engine cradle. The at least one shock absorber reaches the bottom-out position in response to a first predetermined force being exerted on the suspension assembly. The at least one support member resists plastic deformation in response to the first predetermined force being exerted on the suspension assembly. The at least one support member undergoes plastic deformation in response to a second predetermined force being exerted on the suspension assembly. The second predetermined force is greater in magnitude than the first predetermined force. The tunnel resists plastic deformation in response to the second predetermined force being exerted on the suspension assembly.

In a further aspect, the at least one support member is at least one generally triangular support member.

In a further aspect, the at least one support member includes bent sheet metal.

In a further aspect, the at least one support member comprises two support members.

In a further aspect, each of the at least one support member has a generally rearwardly facing base attached to the engine cradle and a generally forwardly facing apex attached to the suspension assembly. The apex is disposed laterally outwardly of the base with respect to a longitudinal center line of the frame.

In a further aspect, a pyramidal support structure is disposed generally above the tunnel and the engine cradle. The pyramidal support structure has two first members connected to the tunnel. The pyramidal support structure has two second members connected to corresponding ones of the two support members. The second members are disposed forwardly of the first members.

In a further aspect, the apex of each of the at least one support member is disposed laterally outwardly of the engine cradle with respect to the longitudinal center line of the frame.

In a further aspect, the magnitude of the second predetermined force is between 17,000 N and 22,000 N. The second predetermined force is oriented in a vertical plane perpendicular to an axis of rotation of the crankshaft and angled upwardly and rearwardly at an angle of between 62 degrees and 68 degrees from horizontal.

In a further aspect, the magnitude of the second predetermined force is about 22,000 N. The second predetermined force is angled upwardly and rearwardly at about 65 degrees from horizontal.

In a further aspect, the suspension assembly includes a generally transverse cross member. Left and right telescopic struts are attached to the cross member. The at least one support member is attached to the suspension assembly via the cross member.

In a further aspect, the suspension assembly is spaced apart from the engine cradle.

For the purposes of this application, directional terms such as "horizontal" and "vertical" in relation to a part of a snowmobile refer to the orientation of the part when placed on a snowmobile that is steered straight on level ground, with a 170 lb driver seated thereon in a normal driving position, and should be understood as they would be perceived by the driver while seated in the normal driving position.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Figure 2:
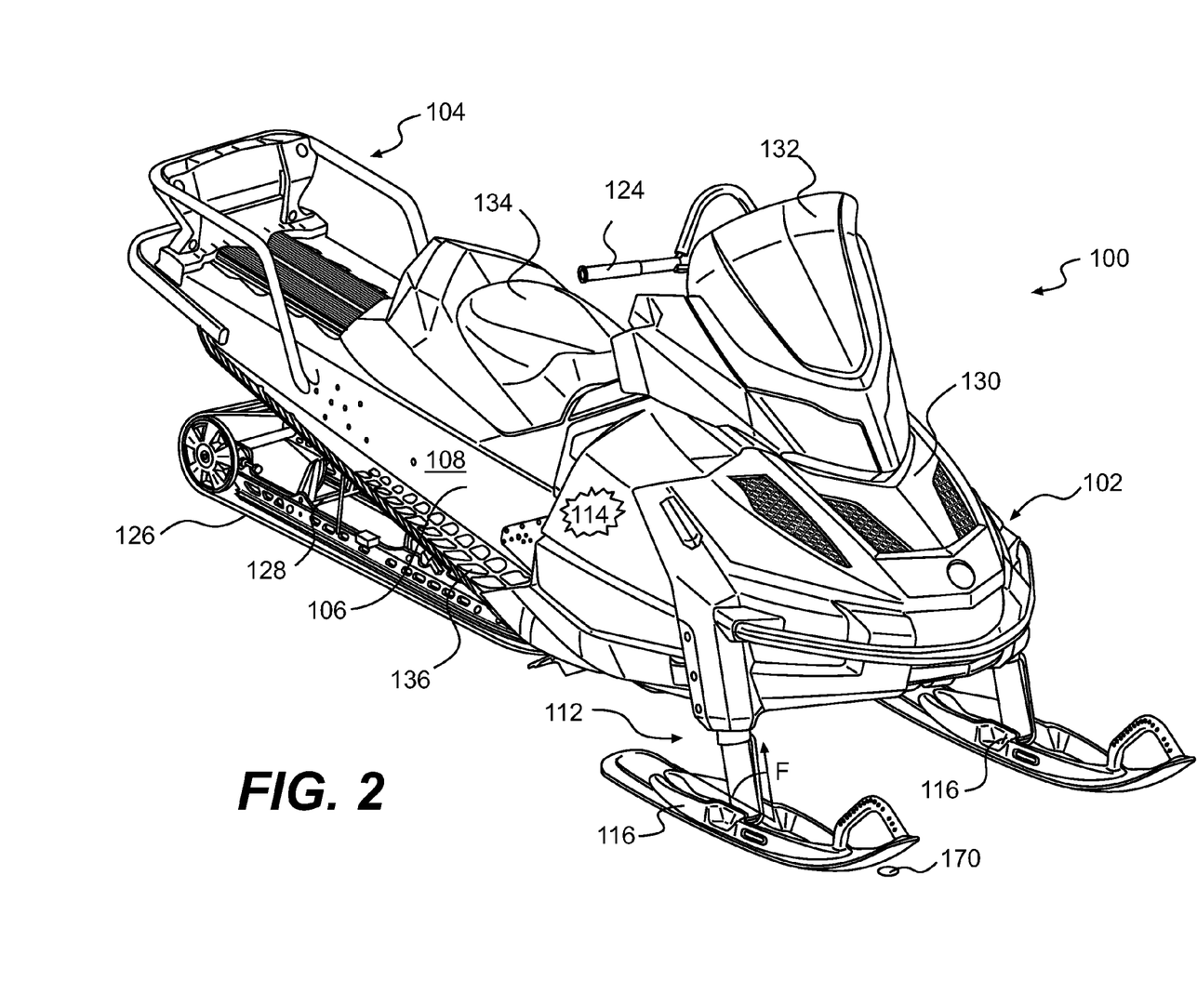
FIG. 2 is a perspective view, taken from a front, right side, of a snowmobile.
Figure 3:
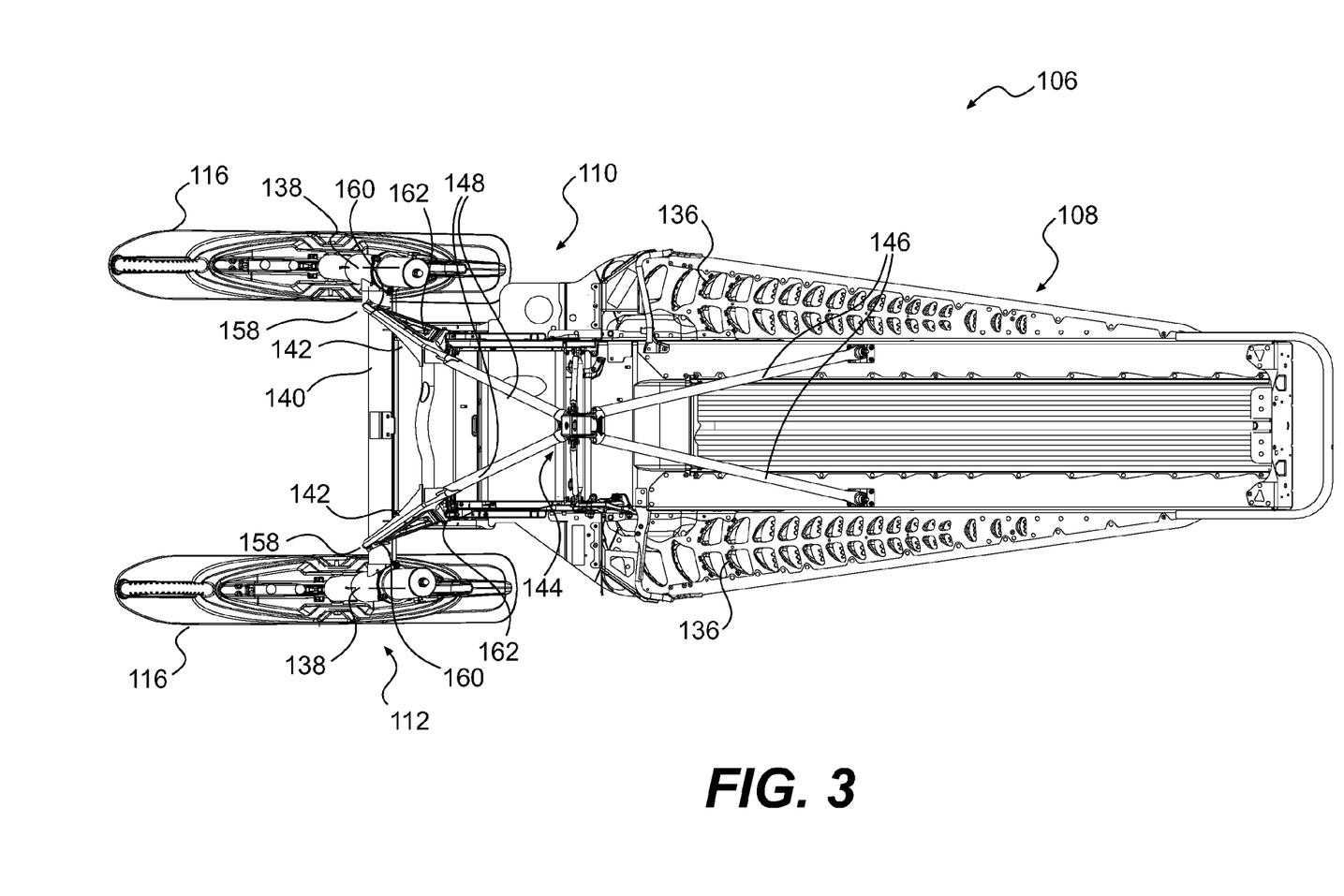
FIG. 3 is a top plan view of a frame and skis of the snowmobile of FIG. 2.
Figure 4:
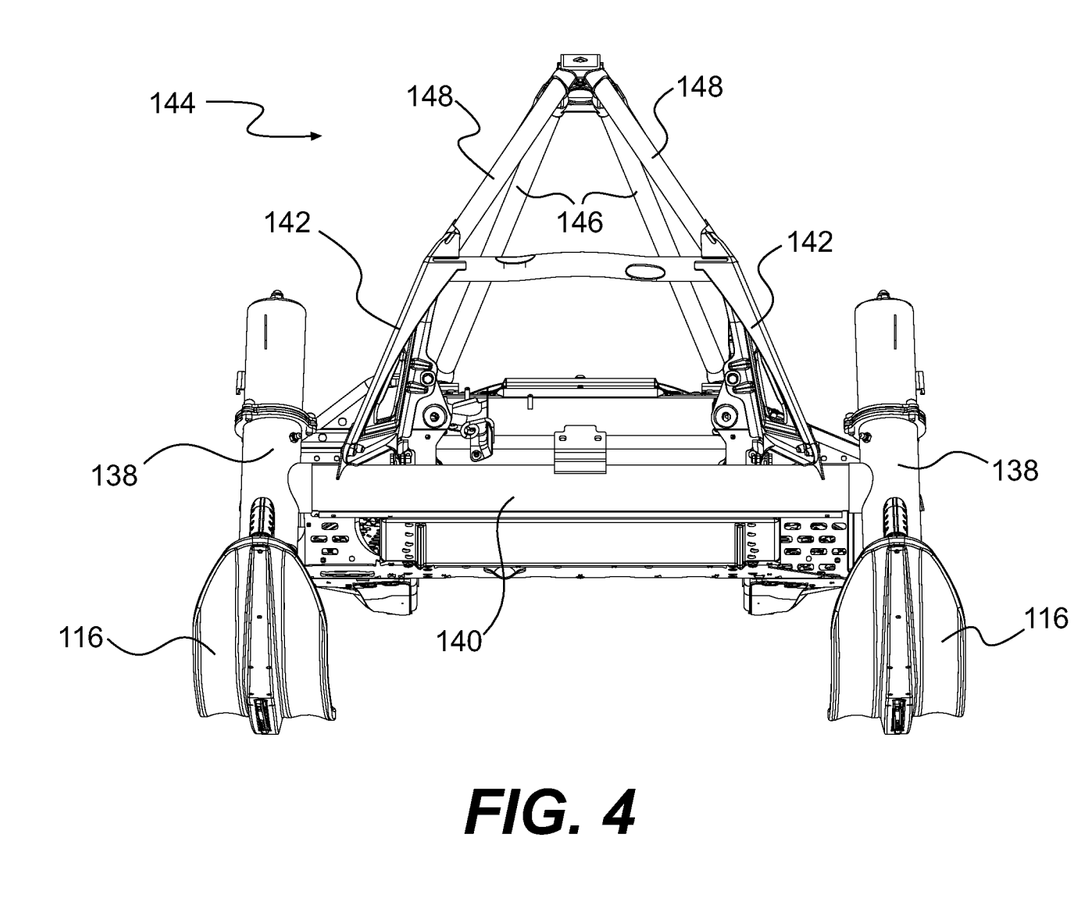
FIG. 4 is a front elevation view of the frame and skis of the snowmobile of FIG. 2.
Figure 5:
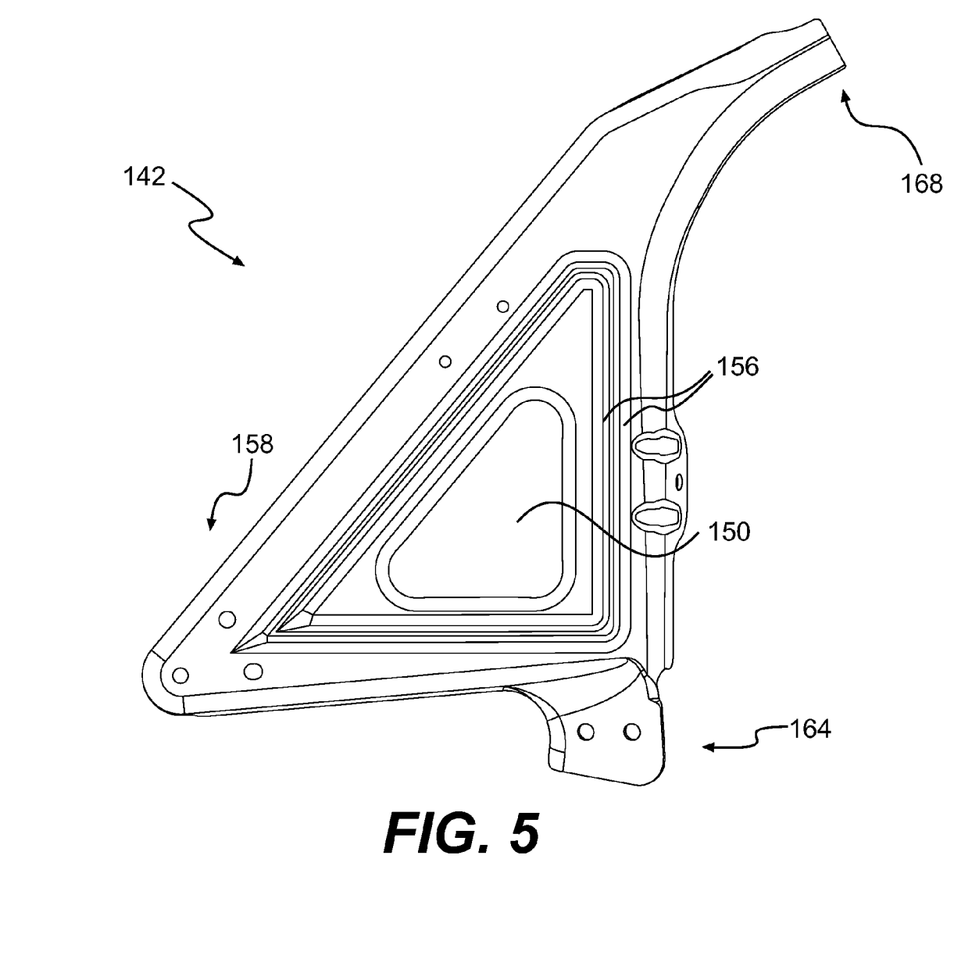
FIG. 5 is a side elevation view of a support member.
Figure 6A:
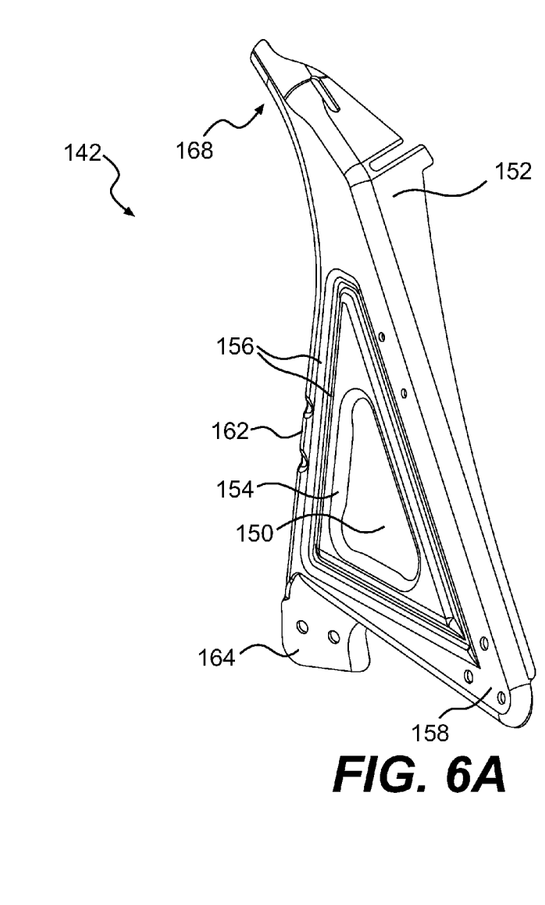
FIGS. 6A and 6B are perspective views, taken from a front, right side, of left and right support members respectively.
Figure 6B:
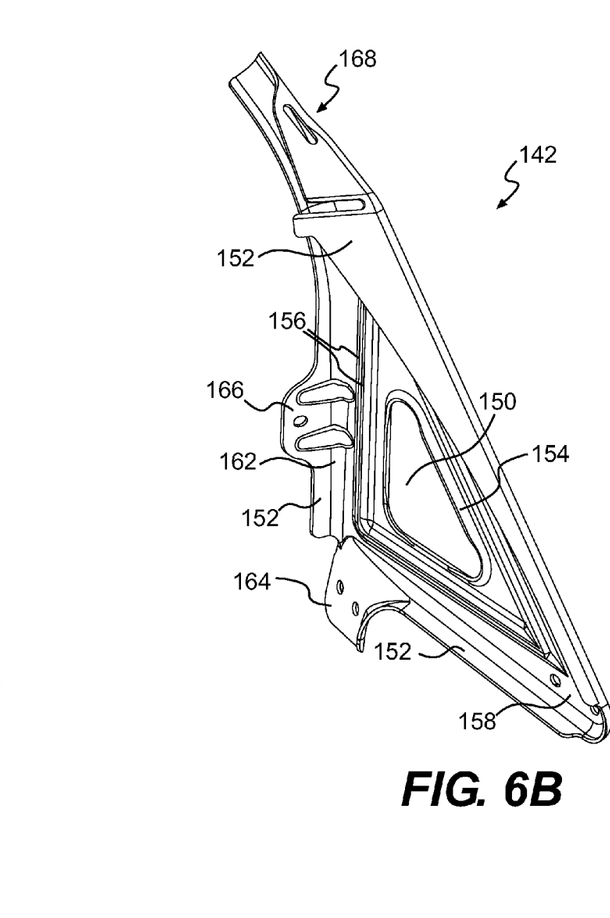

As shown in FIG. 2, a snowmobile 100 according to the present invention includes a forward portion 102 and a rearward portion 104 which are defined consistently with a forward travel direction of the vehicle. As best seen in FIGS. 3 and 4, the snowmobile 100 includes a frame (also known as a chassis) 106 which includes a rear tunnel 108, an engine cradle 110 (seen in FIG. 3) attached to a forward portion of the tunnel 108 and extending forwardly therefrom, and a front suspension assembly 112 disposed forwardly of the engine cradle 110 and attached thereto in a manner that will be discussed below in further detail. An engine 114 (shown schematically) is carried by the engine cradle portion 110 of the frame 106 which forms part of an engine compartment. The engine 114 is oriented such that the crankshaft (not shown) is transverse to the normal direction of travel of the snowmobile 100. Two skis 116 are positioned at the forward portion 102 of the snowmobile 100 and are attached to the frame 106 via the front suspension assembly 112. Each ski 116 is operatively connected to a steering assembly which includes a steering column (not shown) connected to a handlebar 124. The handlebar 124 is used to rotate the skis 116 in order to steer the vehicle.

An endless drive track 126 is positioned at the rear portion 104 of the snowmobile 100 under the tunnel 108. The endless drive track 126 is operatively connected to the engine 114 through a belt transmission system (not shown). The endless drive track 126 is driven to run about a rear suspension assembly 128 to propel the snowmobile 100.

At the front portion 102 of the snowmobile 100, a cowling 130, made of multiple parts, encloses the engine 114 and the belt transmission system, thereby providing an external shell that not only protects the engine 114 and the belt transmission system, but can also be decorated to make the snowmobile 100 more aesthetically pleasing. Typically, the cowling 130 includes a hood and one or more side panels. At least one part of the cowling 130 can be opened or removed to allow access to the engine 114 and the belt transmission system, for example for inspection or maintenance thereof. A windshield 132 is connected to the cowling 130 near the front portion 102 of the snowmobile 100. Alternatively, the windshield 132 could be connected directly to the handlebar 124. The windshield 132 acts as a wind screen to lessen the force of the air on the rider while the snowmobile 100 is moving.

A straddle seat 134 for a driver, and optionally one or more passengers, is positioned atop the tunnel 108 and extends from the rear portion 104 of the snowmobile 100 to the cowling 130. Two footrests 136 are positioned on opposite sides of the snowmobile 100 below the seat 134 to accommodate the driver's and passenger's feet.

Additional aspects and features of a snowmobile will be recognized by persons skilled in the art, and will not be described in detail herein.

Referring now to FIGS. 3 and 4, the attachment of front suspension assembly 112 to the frame 106 of the snowmobile 100 will be described in further detail.

The front suspension assembly 112 consists of left and right telescopic shock absorbers 138 connected to opposite ends of a transverse cross member 140. It is contemplated that other known types of suspension may alternatively be used, such as a double A-arm suspension. The front suspension assembly 112 is spaced apart from the engine cradle 110 and supported thereon by two support members 142 which will be described below in further detail. It is contemplated that a single support member, or more than two support members, may alternatively be used. A pyramidal support structure 144 is disposed generally above the frame 106 and serves to add rigidity to the frame 106. The support structure 144 includes two rearward members 146 attached to the tunnel 108 at their base and extending upwardly, forwardly and laterally inwardly therefrom to the apex of the support structure 144. Two forward members 148 of the support structure 144 extend downwardly, forwardly and laterally outwardly from the apex of the support structure 144 and are connected to the support members 142.

Referring to FIGS. 5, 6A, 6B and 7, one of the support members 142 will be described in detail. It should be understood that the other support member 142 is a mirror image thereof and functions in a substantially similar manner. The support member 142 is made from stamped sheet metal, and has a generally triangular shape. An aperture 150 is provided in the support member 142 by removing a middle portion thereof so as to reduce its weight. The rigidity of the support member 142 is enhanced by the bent outside edges 152 of the support member 142, the bent edges 154 of the aperture 150, and the grooves 156 formed in the body of the support member 142. It is contemplated that the support member 142 may be constructed in any other shape, so long as the support member 142 has the appropriate structural rigidity as will be discussed below in further detail.

Figure 7:
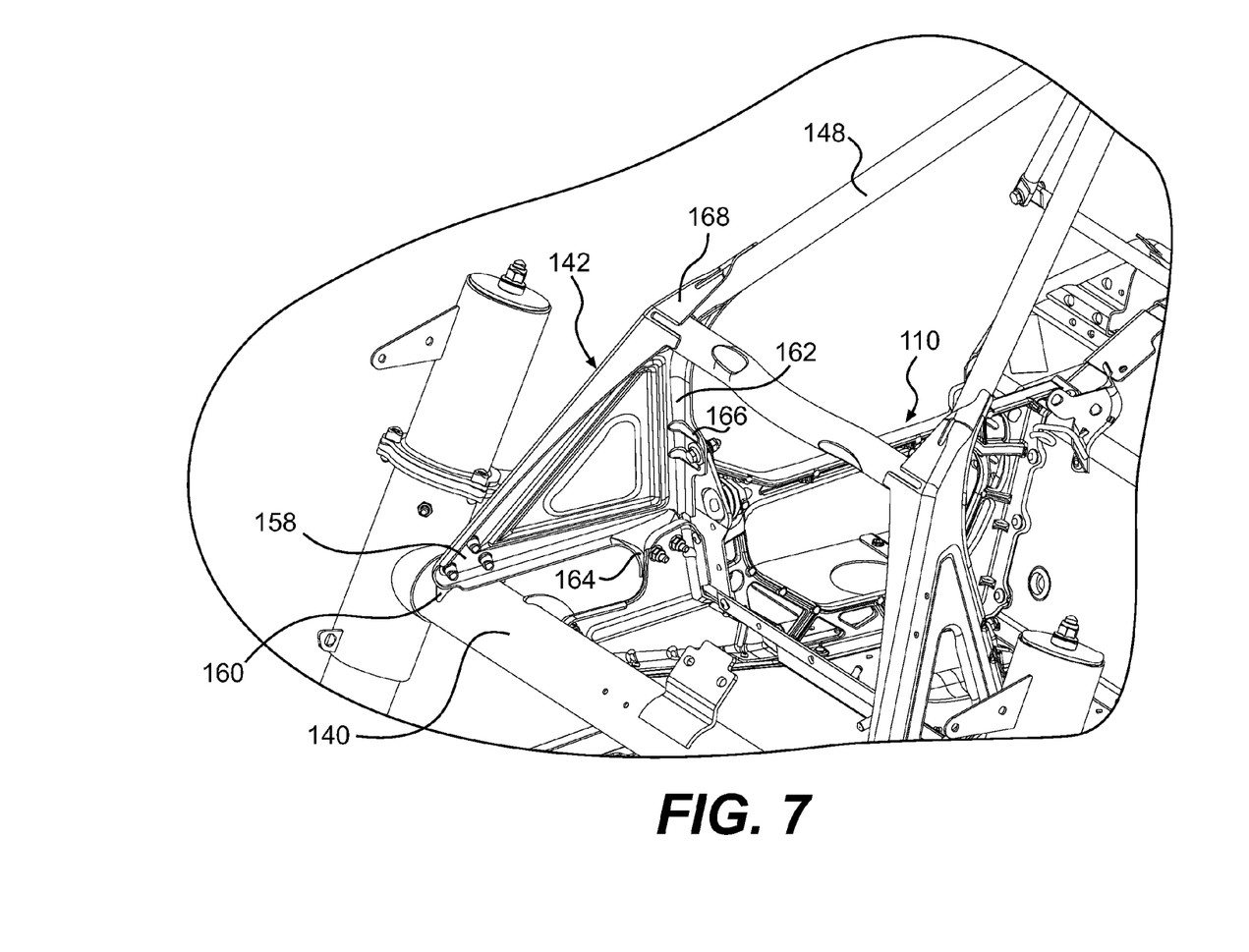
FIG. 7 is a perspective view, taken from a front, left side, of a support member attached to a snowmobile frame.

Referring now to FIG. 7, an apex 158 of the support member 142 is oriented forwardly and is connected to the front suspension subassembly 112 via a flange 160 of the cross member 140. A base 162 of the support member 142 is disposed rearwardly of the apex 158. The base 162 is connected at a lower portion 164 and a middle portion 166 thereof to the engine cradle 110 via corresponding flanges on the support member 142 and the engine cradle 110. An upper portion 168 of the base 162 of the support member 142 is also connected to the forward member 148 of the support structure 144. It is contemplated that the support member 142 may alternatively be connected only to the front suspension assembly 112 and the engine cradle 110. The flange 160 is located laterally outwardly of the engine cradle 110, such that the apex 158 is disposed laterally outwardly of the engine cradle 110 and the base 162 with respect to the longitudinal center line of the vehicle, to provide additional rigidity.

The structure of the support members 142, as well as the number of support members 142 and their arrangement on the frame 106, are selected such that the support members 142 provide a crumple zone between the front suspension assembly 112 and the engine cradle 110. The crumple zone is designed such that if a force exerted on the front suspension assembly 112 would ordinarily be great enough to cause plastic deformation of the tunnel 108, the engine cradle 110 or the support structure 144, the support members 142 will preferentially undergo plastic deformation, thereby absorbing most or all of the force of the impact and either preventing the force of the impact from being transmitted to the tunnel 108, the engine cradle 110 or the support structure 144, or reduce the force of the impact on the tunnel 108, the engine cradle 110 or the support structure 144 to a level that can be withstood by these components without sustaining structural damage. The crumple zone is also designed such that if a force exerted on the front suspension assembly 112 would be too small to cause plastic deformation of the tunnel 108, the engine cradle 110 or the support structure 144, the support members 142 will maintain their shape. The support members 142 can preferably withstand a force as close as possible to the minimum force that would damage the tunnel 108, the engine cradle 110 or the support structure 144, to provide as rigid a frame 106 as possible while still undergoing plastic deformation in preference to the tunnel 108, the engine cradle 110 or the support structure 144 when experiencing a severe impact. It should be understood that the support members 142 may not completely prevent damage to the tunnel 108, the engine cradle 110, or the support structure 144 in every case. It is possible that some impacts might be so severe that even after a portion of the force is absorbed by the plastic deformation of the support members 142, the remaining force transmitted to the tunnel 108, the engine cradle 110, or the support structure 144 will still be sufficient to cause some damage thereto.

The operation of the snowmobile 100 of FIG. 2 will now be discussed by way of example. It should be understood that different snowmobiles will have different frames with different rigidity and other properties, and the maximum force designed to be borne by the support members 142 should be adjusted accordingly, by varying the shape and dimensions of the support members. If the right ski 116 strikes an object 170, a force F is exerted on the front suspension assembly 112. It was determined through experimentation that the force F is typically exerted at an angle θ of 62-68 degrees from horizontal, and in a vertical plane perpendicular to the transverse axis of the crankshaft, due to the geometry of the snowmobile front suspensions and the conditions in which they are typically used. If the force F exceeds about 1600 Newtons, the force will be sufficient to fully compress the right shock absorber to a bottom-out position. If the force F exceeds about 17,000-22,000 N, the support members 142 will structurally fail and undergo plastic deformation, thereby absorbing the impact and, in the majority of cases, protecting the tunnel 108, the engine cradle 110 or the support structure 144 from the damage the tunnel 108, the engine cradle 110 or the support structure 144 would normally sustain from such a large force. The snowmobile 100 can later be conveniently and inexpensively repaired by replacing the support members 142. The support members 142 for this particular snowmobile may therefore be designed to withstand a force of about 22,000 N exerted on the front suspension assembly 112 at a 65 degree angle from horizontal before undergoing plastic deformation. Through experimentation conducted by applying a static force to an isolated snowmobile frame to simulate the effects of a severe impact, it was determined that this 22,000 N threshold provided sufficient rigidity so the rider would not notice a difference in the overall structural properties of the snowmobile 100 compared to prior art snowmobiles, while still protecting the tunnel 108, the engine cradle 110 or the support structure 144 from damage.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A snowmobile frame comprising:
    a tunnel having an inverted U-shape;
    an engine cradle for supporting an engine with a crankshaft oriented transversely, the engine cradle being attached to a forward portion of the tunnel and extending forwardly from the tunnel;
    a suspension assembly disposed forwardly of the engine cradle; and
    at least one support member supporting the suspension assembly on the engine cradle, the at least one support member being at least one generally triangular support member,
    each of the at least one support member having a rearward portion connected to the engine cradle and a forward portion connected to the suspension subassembly,
    the at least one support member forming a crumple zone between the suspension assembly and the engine cradle.

2. The snowmobile frame of claim 1, wherein the at least one support member comprises two support members.

3. The snowmobile frame of claim 2, wherein:
    each of the at least one support member has a generally rearwardly facing base attached to the engine cradle and a generally forwardly facing apex attached to the suspension assembly; and
    the apex is disposed laterally outwardly of the base with respect to a longitudinal center line of the frame.

4. The snowmobile frame of claim 3, further comprising a pyramidal support structure disposed generally above the tunnel and the engine cradle, the pyramidal support structure having:
    two first members connected to the tunnel; and
    two second members connected to corresponding ones of the two support members, the second members being disposed forwardly of the first members.

5. The snowmobile frame of claim 3, wherein the apex of each of the at least one support member is disposed laterally outwardly of the engine cradle with respect to the longitudinal center line of the frame.

6. The snowmobile frame of claim 1, wherein:
    the at least one support member undergoes plastic deformation in response to a force of between 17,000 N and 22,000 N exerted on the suspension assembly, the force being oriented in a vertical plane parallel to a normal forward direction of travel of the snowmobile and angled upwardly and rearwardly at an angle of between 62 degrees and 68 degrees from horizontal.

7. The snowmobile frame of claim 6, wherein:
    the force is about 22,000 N; and
    the force is oriented at an angle of about 65 degrees from horizontal.

8. The snowmobile frame of claim 1, wherein the suspension assembly includes:
    a generally transverse cross member; and
    left and right telescopic struts attached to the cross member;
    wherein the at least one support member is attached to the suspension assembly via the cross member.

9. The snowmobile frame of claim 1, wherein the suspension assembly is spaced apart from the engine cradle.

10. A snowmobile frame comprising:
    a tunnel having an inverted U-shape;
    an engine cradle for supporting an engine with a crankshaft oriented transversely, the engine cradle being attached to a forward portion of the tunnel and extending forwardly from the tunnel;
    a suspension assembly disposed forwardly of the engine cradle, the suspension assembly including at least one shock absorber, the at least one shock absorber having a bottom-out position, the suspension assembly including a generally transverse cross member and left and right telescopic struts, the left and right telescopic struts being attached to the cross member; and
    at least one support member extending forwardly from the engine cradle at a first end and supporting the suspension assembly at a second end, the at least one support member being attached to the suspension assembly via the cross member,
    the at least one shock absorber reaching the bottom-out position in response to a first predetermined force being exerted on the suspension assembly,
    the at least one support member resisting plastic deformation in response to the first predetermined force being exerted on the suspension assembly,
    the at least one support member undergoing plastic deformation in response to a second predetermined force being exerted on the suspension assembly, the second predetermined force being greater in magnitude than the first predetermined force, and
    the tunnel resisting plastic deformation in response to the second predetermined force being exerted on the suspension assembly.

11. The snowmobile frame of claim 10, wherein the at least one support member is at least one generally triangular support member.

12. The snowmobile frame of claim 11, wherein the at least one support member comprises two support members.

13. The snowmobile frame of claim 12, wherein:
    each of the at least one support member has a generally rearwardly facing base attached to the engine cradle and a generally forwardly facing apex attached to the suspension assembly; and
    the apex is disposed laterally outwardly of the base with respect to a longitudinal center line of the frame.

14. The snowmobile frame of claim 13, further comprising a pyramidal support structure disposed generally above the tunnel and the engine cradle, the pyramidal support structure having:
    two first members connected to the tunnel; and
    two second members connected to corresponding ones of the two support members, the second members being disposed forwardly of the first members.

15. The snowmobile frame of claim 13, wherein the apex of each of the at least one support member is disposed laterally outwardly of the engine cradle with respect to the longitudinal center line of the frame.

16. The snowmobile of claim 10, wherein:
the magnitude of the second predetermined force is between 17,000 N and 22,000 N; and
the second predetermined force is oriented in a vertical plane perpendicular to an axis of rotation of the crankshaft and angled upwardly and rearwardly at an angle of between 62 degrees and 68 degrees from horizontal.

17. The snowmobile of claim 16, wherein:
the magnitude of the second predetermined force is about 22,000 N; and
the second predetermined force is angled upwardly and rearwardly at about 65 degrees from horizontal.

18. The snowmobile frame of claim 10, wherein the suspension assembly is spaced apart from the engine cradle.

\* \* \* \* \*